United States Patent [19]
de Nijs et al.

[11] Patent Number: 5,568,525
[45] Date of Patent: Oct. 22, 1996

[54] SYSTEM AND METHOD FOR CONNECTION OF MULTIPLE PROTOCOL TERMINALS

[75] Inventors: Richard H. J. de Nijs; Charles L. Haymes; Dale T. Ulmer, all of Raleigh, N.C.

[73] Assignee: International Business Machines Corporation, Armonk, N.Y.

[21] Appl. No.: 109,185

[22] Filed: Aug. 19, 1993

[51] Int. Cl.$^6$ .................................................. H04L 7/00
[52] U.S. Cl. ...................... 375/356; 370/85.5; 370/85.14
[58] Field of Search .................................... 375/106, 107, 375/108, 359; 370/100.1, 103, 105.2, 95.1, 95.3, 85.1, 85.5, 85.12, 85.14

[56] References Cited

U.S. PATENT DOCUMENTS

| | | | |
|---|---|---|---|
| 4,696,001 | 9/1987 | Gagliardi et al. | 370/100.1 X |
| 4,805,169 | 2/1989 | Van Asselt | 370/100.1 X |
| 4,955,020 | 9/1990 | Stone et al. | 375/107 X |
| 5,012,470 | 4/1991 | Shobs et al. | 370/110.1 |
| 5,228,030 | 7/1993 | Dresher | 375/108 X |

OTHER PUBLICATIONS

IBM, TDB, vol. 29, No. 9, Feb. 1987, pp. 3776–3778.
IBM, TDB, Jul., 1986, pp. 892–900.

*Primary Examiner*—Stephen Chin
*Assistant Examiner*—Bryan E. Webster
*Attorney, Agent, or Firm*—Stephen T. Keohane

[57] ABSTRACT

A network port configurator device for automatically configuring a system having network workstations and corresponding network equipment of various physical protocols. The network port configurator comprises a plurality of input and output ports for receiving physical wiring to which the workstations and network equipment are attached. Detection circuitry attached to the input and output ports determine the physical protocol of the attached workstations and network equipment by determining a characteristic of the attached equipment. Examples of identifying characteristics include a characteristic impedance, a characteristic voltage, and a characteristic cable identification of the workstation. Logic circuitry uses this information to control a circuit switching mechanism that connects the input ports to the output ports.

20 Claims, 5 Drawing Sheets

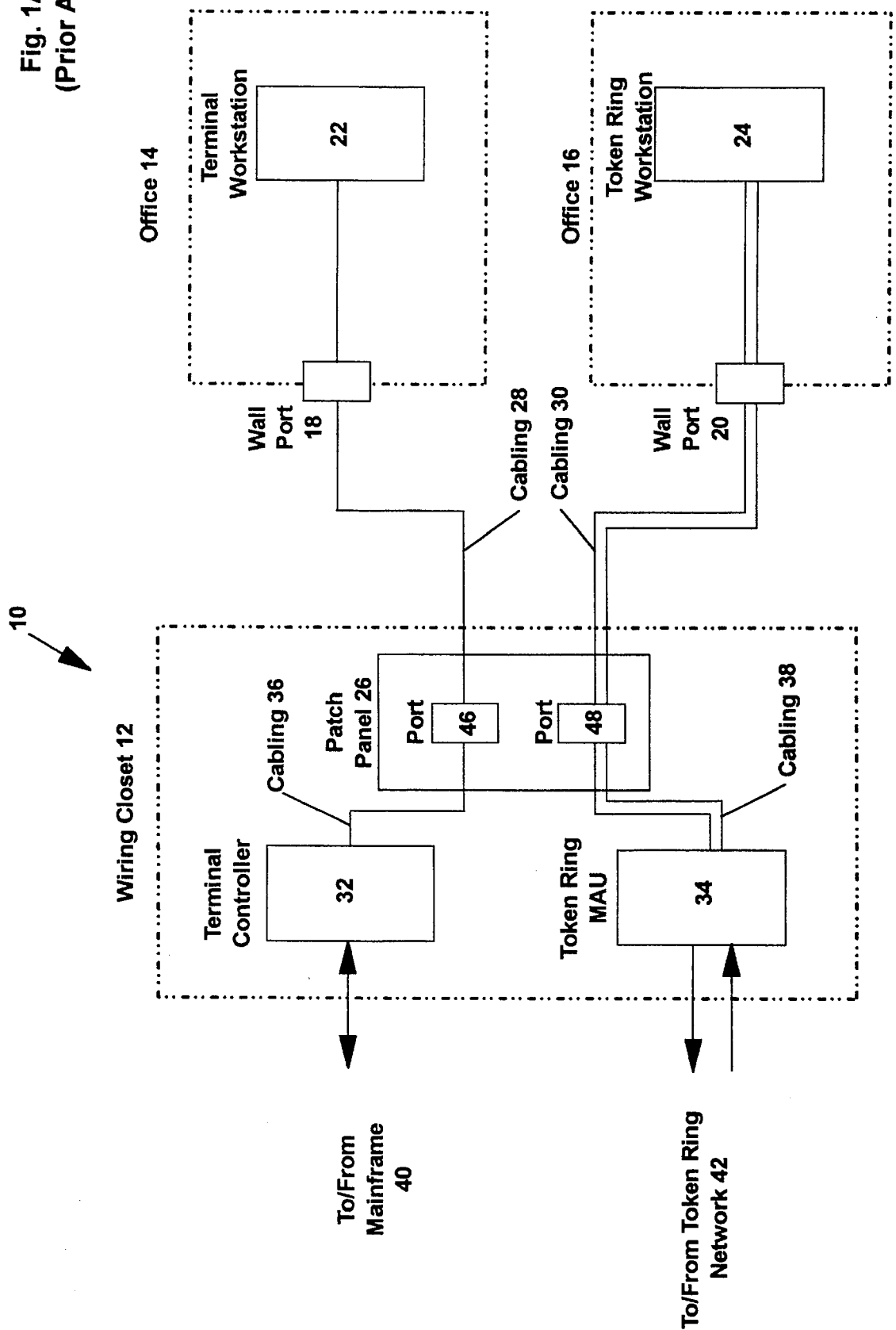

SYSTEM AND METHOD FOR CONNECTION OF MULTIPLE PROTOCOL TERMINALS

BACKGROUND OF THE INVENTION

1. Field of the Invention

The present invention relates to the interconnection of digital communications networks and, more particularly, to a system for automatically connecting a network workstation of a particular protocol type with network equipment of the same protocol type.

2. Background and Prior Art

Rapid changes in digital communications networks have generated a multiplicity of network types, many of which co-exist. For example, many times both host-centric and distributed communications networks are used within a business environment. Each type of network has a useful function necessary in many business environments.

A host-centric communications network is one in which all information transferred between connected devices is managed by a central host processor unit. An example of a host-centric network is one comprising a mainframe from International Business Machines (IBM)® (such as a System/390®) having a plurality of display terminals (such as IBM 3270 Information Display Systems) connected via a control unit (such as an IBM 3174 terminal controller).

A distributed communications network is one in which information is transferred between devices attached to the network without the intervention of a central host processor. These distributed networks can be constructed from local area network technologies, such as Ethernet (as defined by the IEEE 802.3 standard) or token ring (IEEE 802.5 standard).

The ad hoc development and deployment of the various types of networks in earlier years has resulted in non-compatibility for interconnection. Each network type has its own protocols under which it operates and communicates with other networks of the same protocol type. For instance, a networking protocol may define the manner in which the data is framed or in which errors are checked. Furthermore, a networking protocol normally defines the physical interface, or the actual physical connectivity and medium used by the network. This physical interface definition is analogous to the physical layer of the seven-layer Open Systems Interface (OSI) reference model. Examples are the use of unshielded twisted pair, coaxial or fiber optic cabling for the transmission of bit streams across the particular physical medium. Thus, a business having multiple networks, each of a unique protocol, many times has corresponding sets of wiring in its facility to accommodate them.

Currently, as multiple networks are installed in facilities, the wiring and physical ports compatible with each type of network physical interface also are installed. That is, distinct sets of wiring media are routed throughout the facility to the points where the distinct network workstations (devices/terminals) and network equipment (such as hosts or host control units) are located.

Common practice is to install the various sets of wiring media in a star configuration from a wiring hub or termination point to the network workstations and to the network equipment in a point-to-point manner. This method of wiring also facilitates the management of the networks by providing a central management point as well as resolving the architectural considerations to provide spaces, such as wiring closets, to house electrical wiring panels and communications equipment.

Contemporary installation of wiring media utilizes a single multiprotocol cable that is electrically compatible with several network types. For example, data-grade, shielded-twisted pair wiring is being used to transmit data conforming to the token ring, Ethernet 10baseT, and RS232 serial protocols.

The use of such a multiprotocol medium eliminates the need to wire facilities differently for each unique network. In addition, such a wiring system permits a device, equipped with one of many interfaces, connected to a nearby port wired with the single multiprotocol medium to communicate with the appropriate controller, concentrator, multiplexor, or hub connected at the other end to complete the network connection. Furthermore, the use of such multiprotocol medium permits a device to be moved to another office, for instance, no matter which physical interface the device has if the office has a multiprotocol-wired port.

An example of this is shown in FIG. 1A. The system 10 comprises a wiring closet 12 for providing a centralized location for the network wiring to terminate, and two offices, Office 14 and Office 16, each having a wall port, Wall Port 18 and Wall Port 20. Office 14 has a Terminal Workstation 22 connected to Wall Port 18 while Office 16 has a Token Ring Workstation 24 connected to Wall Port 20.

In Wiring Closet 12, a Patch Panel 26 connects Cabling 28 from Wall Port 18 and Cabling 30 from Wall Port 20 to a Terminal Controller 32 and a Token Ring Multistation Access Unit (MAU) 34 via Cabling 36 and Cabling 38, respectively. Terminal Controller 32 and Token Ring MAU 34 are respectively connected to their corresponding networks via Cabling 40 (to/from Mainframe) and Cabling 42 (to and from token ring network).

In the case where Cabling 28 and Cabling 30 are multi-protocol wiring media, in this case, both supporting the token ring (for Token Ring Workstation 24) and synchronous data link control (SDLC) (for Terminal Workstation 22) physical medium protocols, Token Ring Workstation 24 may be moved to Office 14 and connected to Wall Port 18 as Cabling 28 supports the token ring physical protocol. Likewise, Terminal Workstation 22 may be moved to Office 16 and connected to Wall Port 20. In .order for the network workstations to communicate with their respective networks, however, Cabling 36 and Cabling 38 must be swapped at Patch Panel 26, i.e., Cabling 36 must be disconnected from Patch Panel Port 46 and connected to Patch Panel Port 48 and vice versa with Cabling 38. This process is a manual one and requires that a technician, first, find the cable associated with the newly attached device, then disconnect the cable from its current point of attachment, and finally, reconnect it to a designated port on equipment that is compatible with the device being attached.

Other communications equipment, known as media centers or intelligent hubs (IHUBS), have been devised to replace patch panels in wiring closets so that the networks connected thereto can be remotely managed. Similarly, in this system, the terminals or other devices are connected to wall ports which are attached by various media, including multiprotocol media, to these hubs. Within the IHUBs, modules, or "blades", for each individual protocol type supported (such as token ring or Ethernet networks) are installed. The workstations are connected to these blades. It is possible to remotely reconfigure such an IHUB by means of a network manager so that a workstation of one type, such as a token ring workstation, may be disconnected from its port and reconnected to another port, so long as the other port is connected to a token ring blade within the IHUB.

However, a workstation of one type may not be moved to a port configured for another type of workstation. This is shown in FIG. 1B where Terminal Workstation 22 in Office 14 is connected to Terminal Controller Blade 32' in IHUB 50 and Token Ring Workstation 24 in Office 16 is connected to Token Ring Blade 34' in IHUB 50. If Terminal Workstation 22 and Token Ring Workstation 24 were to exchange offices, Terminal Workstation 22 moving to Office 16 and connecting to Wall Port 20 and Token Ring Workstation 24 moving to Office 14 and connecting to Wall Port 18, Cabling 28 and Cabling 30 would have to be manually exchanged. The IHUB 50 is only reconfigurable using Network Manager 52 if the workstations are of the same protocol type and are connected to the same blade or different blades (if an additional bridging blade were available and installed).

Presently, there is no system or method of automatically connecting a network workstation with its corresponding network equipment based upon physical interface protocol of the network. There is a need for such a system as network workstations become more portable as laptop and palmtop personal computers become more prolific in their use. This requirement is shown by the existence of these and other PCs having more than one network interface adapter installed therein.

SUMMARY OF THE INVENTION

A network port configurator device for automatically configuring a system having network workstations and corresponding network equipment of various physical protocols. The network port configurator comprises a plurality of input and output ports for receiving physical wiring to which the workstations and network equipment are attached. Detection circuitry attached to the input and output ports determine the physical protocol of the attached workstations and network equipment by determining a characteristic of the attached equipment. Examples of an identifying characteristic include a characteristic impedance, a characteristic voltage, and a characteristic cable identification of the workstation. Logic circuitry uses this information to control a circuit switching mechanism that connects the input ports to the output ports.

BRIEF DESCRIPTION OF THE DRAWINGS

While the technical description concludes with claims particularly pointing out and distinctly claiming that which is regarded as the invention, details of a preferred embodiment of the invention may be more readily ascertained from the following technical description when read in conjunction with the accompanying drawings, where:

FIG. 1A is a block diagram illustrating a prior art installation of two types of networks in a facility.

DETAILED DESCRIPTION OF THE PREFERRED EMBODIMENT

Figure 1B:
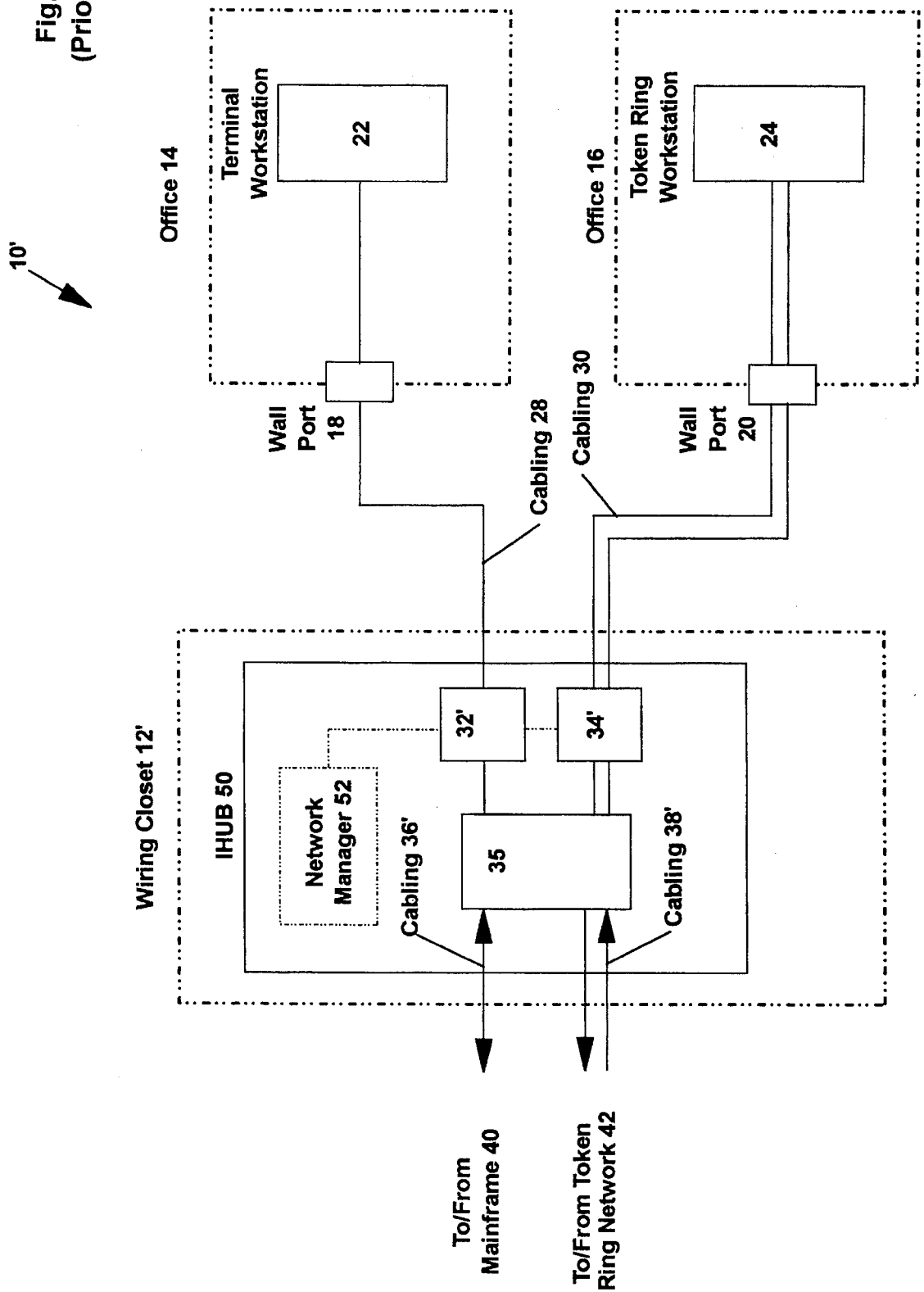
FIG. 1B is a block diagram illustrating a second prior art installation of two types of networks in a facility.
Figure 2:
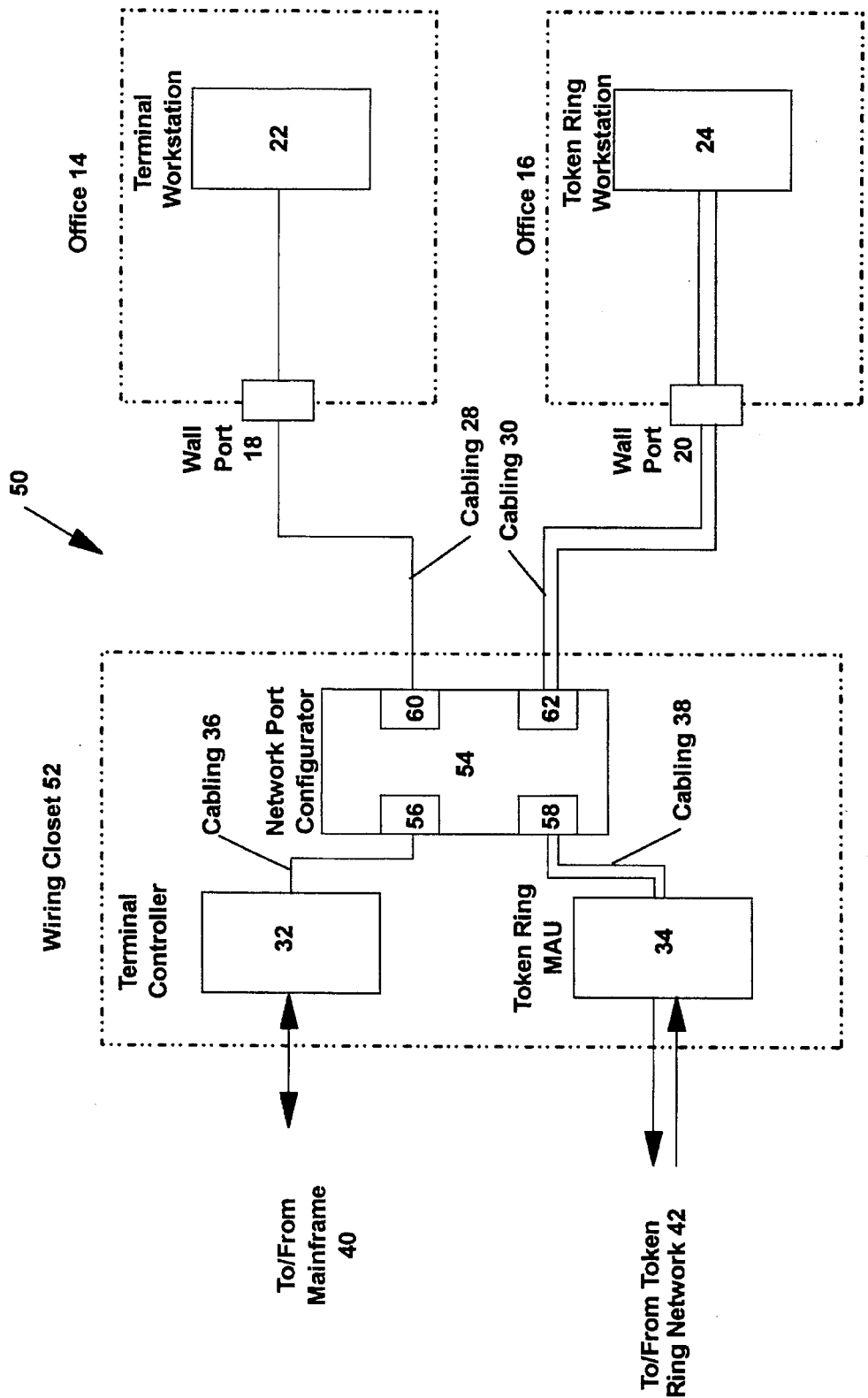
FIG. 2 is a block diagram illustrating an installation, in a facility, of two types of networks using the network port configurator of the present invention.

FIG. 2 illustrates a facility 50, similar to the facility shown in FIGS. 1A and 1B, but having the network port configurator 54 of the present invention installed therein. Facility 50 comprises offices 14 and 16 having Terminal Workstation 22 and Token Ring Workstation 24, respectively. Facility 50 further has a Wiring Closet 52 connected to Offices 14 and 16 via multiprotocol Cabling 28 and 30, respectively. Wiring Closet 52 has a Terminal Network Controller 32 for communicating with the Terminal Workstation 22 and a Token Ring Multistation Access Unit (MAU) 34 for communicating with the Token Ring Workstation 24. Terminal Network Controller 32 and Token Ring MAU 34 are connected to the Network Port Configurator 54 of the present invention via Cabling 36 and 38, respectively. Terminal Network Controller 32 and Token Ring MAU 34 are connected to, respectively, a mainframe and a token ring network via Cabling 40 (to/from mainframe) and Cabling 42 (to/from token ring network).

The Network Port Configurator 54 of the present invention automatically connects a network workstation (i.e., Terminal Workstation 22 and Token Ring Workstation 24) with its corresponding network equipment (Terminal Network Controller 32 and Token Ring MAU 34) based upon physical interface protocol of the network workstation and corresponding network equipment. For instance, where Terminal Workstation 22 is disconnected from Wall Port 18 and is moved to Office 16 and connected to Wall Port 20, the Network Port Configurator 54 senses that Terminal Workstation 22 is connected at its Port 62 and automatically establishes a connection between Port 62 and Port 56. The Network Port Configurator 54 accomplishes this by detecting and determining a characteristic of the attached network workstations at Ports 60, 62. Because each type of network workstation has a unique characteristic, the Network Port Configurator is able to determine which type of workstation is attached thereto. Similarly, each type of network equipment has a unique characteristic and, therefore, can be distinguished by the Network Port Configurator 54 from other types of network equipment. It is in this manner that the Network Port Configurator of the present invention is able to automatically reconfigure itself so that the network workstations are connected to their corresponding network equipment even where the network workstation is disconnected from its original location and reconnected elsewhere. This is accomplished without any manual intervention.

The detectable unique characteristic of the various workstations can vary, depending upon the network protocol type. For example, the characteristic impedances of a token ring workstation, an Ethernet workstation and a terminal workstation (a 3270-type terminal) are three distinct and detectable impedances. By detecting and determining the impedance of the attached device (if it is one of these three types), the Network Port Configurator may determine which type it is in order to connect it to its corresponding network equipment.

Figure 3B:
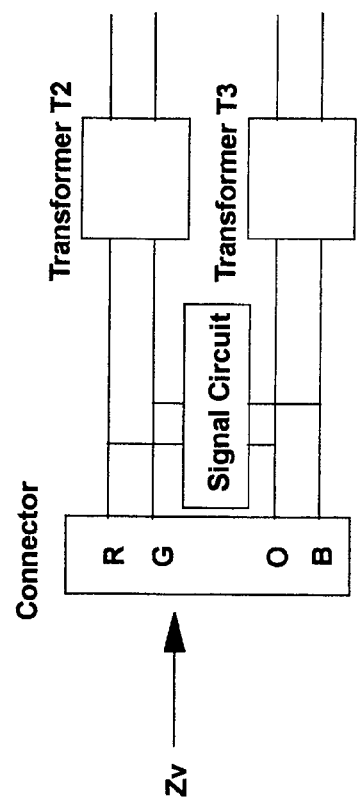
FIGS. 3A, 3B and 3C are diagrams illustrating the characteristic impedance of a terminal workstation, a token ring workstation and an Ethernet workstation, respectively.
Figure 3A:
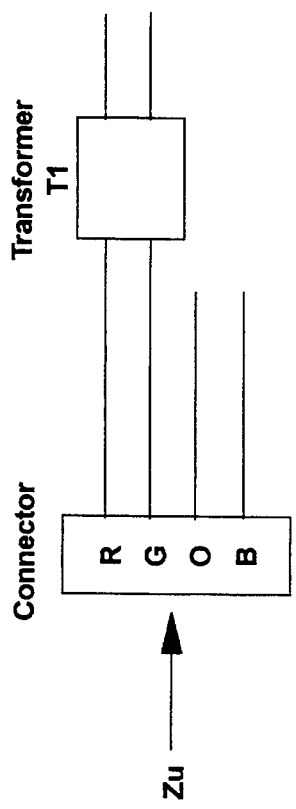
Figure 3C:
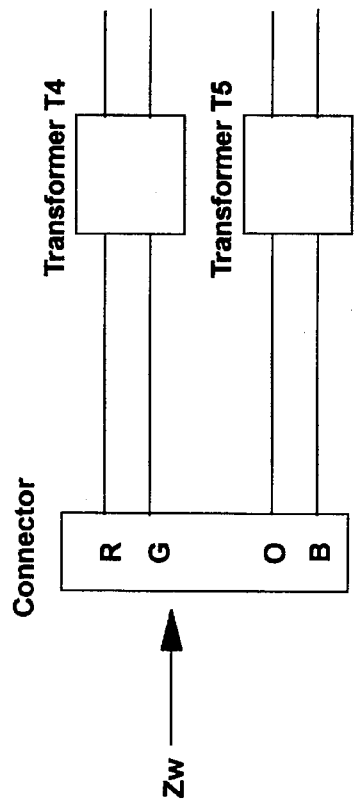

Schematic diagrams of the characteristic impedance of a token ring, a 10baseT Ethernet and a terminal workstation are shown in FIGS. 3A, 3B and 3C. As shown in FIG. 3A, the characteristic impedance of a terminal workstation, such as a 3270-type workstation, is indicated by Zu. Of a standard four-wire connector having wires R, G, O, and B, Connector 51a uses only wires R and G. The impedance between these two wires is the transformer impedance of transformer T1. There is nothing connected to Wires O and B and, therefore, the impedance between the two wires is open. The overall characteristic impedance of the 3270-type terminal is Zu.

FIG. 3B illustrates the characteristic impedance of a token ring workstation. The characteristic impedance of this workstation is Zv. The Connector 51b of the token ring workstation uses all four wires R, G, O, and B and has transformers T2 and T3 connected therebetween. The token ring workstation further has a Signal Circuit 53 connected between R/O and G/B. The overall characteristic impedance of the token ring workstation is Zv.

FIG. 3C illustrates the characteristic impedance of an Ethernet 10baseT workstation. The characteristic impedance of this workstation is Zw. The Connector 51c of the Ethernet 10baseT workstation uses all four wires R, G, O, and B and has transformers T4 and T5 connected therebetween. As was noted above, the overall characteristic impedance of the Ethernet 10baseT workstation is Zw.

Thus, as each of these workstations has a different characteristic impedance which can be easily detected and determined, the Network Port Configurator of the present invention merely determines the characteristic impedance of the attached device in order to determine which particular device is attached to each particular port. Characteristic impedance is shown as but one example of a characteristic by which workstations may be distinguished. Other examples include characteristic voltage levels and cable identifications.

Figure 4:
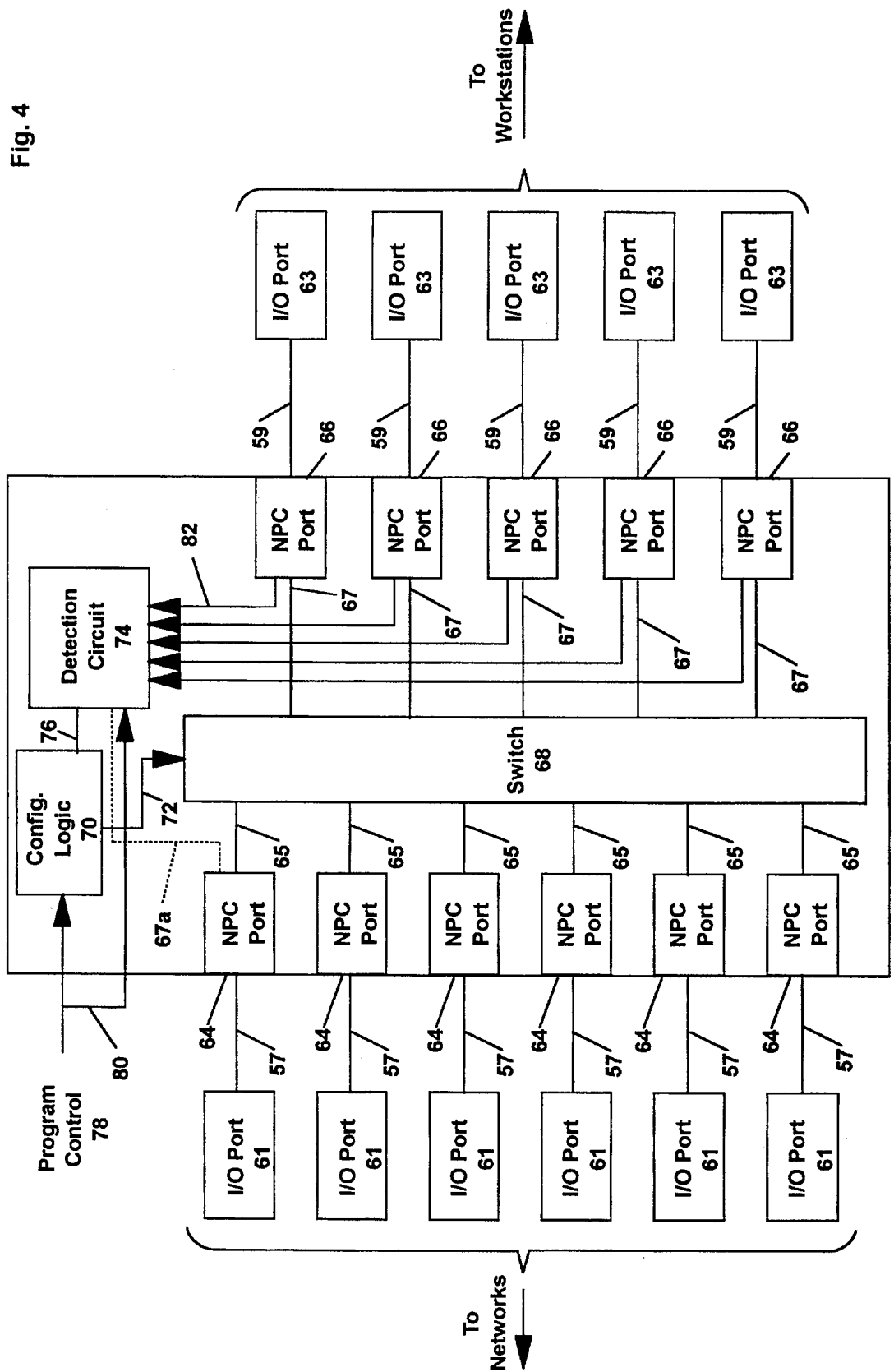
FIG. 4 is a block diagram of the network configurator of the present invention.

FIG. 4 illustrates in detail one embodiment of the Network Port Configurator 54 of the present invention. Network Port Configurator 54 comprises a plurality of Network Port Configurator (NPC) Ports 64, 66, NPC Ports 64 for being connected to I/O Ports 61 (for network equipment) and NPC Ports 66 for being connected to I/O Ports 63 (for network workstations). I/O Ports 61, 63 are connected to the Network Port Configurator 54 by multiprotocol cabling 57, 59. Connected between NPC Ports 64, 66 via cabling 65, 67, respectively, is a Switch 68. Switch 68 can be any type of switch which is capable of switching any of the NPC Ports 66 to any of the NPC Ports 64, such as a cross-bar switch. Switch 68 is responsive to control signals transmitted by Configuration (Config.) Logic 70 and conveyed by cabling 72. Config. Logic 70 is further connected to Detection Circuitry 74 via cabling 76. Both Config. Logic 70 and Detection Circuitry 74 are under the control of Program Control 78 via cabling 80. Detection Circuitry 74 is connected to each of the NPC Ports 66 via cabling 82.

In general, the Network Port Configurator 54 operates as follows. I/O Ports 63 are located in various offices throughout a facility operating a number of different network protocols, such as token ring networks, Ethernet networks, and 3270-type networks. Connected to the I/O Ports 63 are network workstations for communicating on the various networks. Examples of such network workstations are token ring workstations, Ethernet workstations and 3270 terminals. On the other side of the Network Port Configurator 54 are connected the network equipment to I/O Ports 61. Examples of network equipment are a token ring multistation access unit (MAU), an Ethernet concentrator, and a 3174 terminal controller. The network workstations are connected to the corresponding network equipment through Switch 68. Config. Logic 70, which consists of logic circuitry and switch drivers, generates and transmits control signals to the Switch 68 for setting the Switch in the proper configuration, i.e., so that network workstations communicate with their respective and corresponding network equipment. Config. Logic 70 generates these control signals based upon signals it receives from Detection Circuitry 74 and Program Control 78.

Detection Circuitry 74, which is connected to each of NPC Ports 66, contains circuitry for detecting and determining the particular characteristic of the network workstations (such as characteristic impedance) connected to the I/O Ports 63. Based upon the characteristic of the respective network workstations (and further based upon the Program Control 78), the Detection Circuitry transmits signals to the Config. Logic 70 so that Switch 68 may be configured properly.

Because the particular detected characteristic of each of the various types of network workstations is different from one another, the Detection Circuitry 74 can determine which type of network workstation is connected to the NPC Port 66. The Detection Circuitry 74 forwards this information, i.e., which type of workstation is connected to which NPC Port 66, to Config. Logic 70. Through Program Control 78, Config. Logic 70 knows which types of network equipment are connected to which NPC Ports 64. By knowing which type of network workstation is attached to which NPC Port 66, the Config. Logic 70 is able to transmit the proper control signals to Switch 68 so that the Switch 68 is properly configured, i.e., the network workstations are connected to their corresponding network equipment.

Alternatively, Detection Circuitry 74 may be connected to NPC Ports 64, as shown by dashed lines 67a. (For clarity, only one dashed line 67a is shown. Not shown are the other dashed lines between the remaining NPC Ports 64 and the detection Circuit 74.) In this case, Detection Circuitry 74 is able to detect a characteristic of the attached network equipment, in addition to being able to detect a characteristic of the network workstations. Because the various types of network equipment have unique characteristics (as do the workstations), the Network Port Configurator of the present invention is able to distinguish them and automatically configure itself so that the network workstations are properly connected with their corresponding network equipment.

Thus, it can be seen that the method and system of the present invention allows network workstations connected to the system to be disconnected, moved and reconnected to another port of the system and be automatically connected to its corresponding network equipment for communication. This is accomplished through the unique utilization of a detection circuit which detects a characteristic of the attached workstations, such as characteristic impedance, so that the system may determine the type of network. It is in this manner that the workstation may be automatically connected to its corresponding network equipment without manual intervention. While the invention has been particularly shown and described with reference to preferred embodiments thereof, it will be understood by those skilled in the art that various other changes in form and detail may be made without departing from the spirit and scope of the invention.

What is claimed is:

1. For use with a plurality of network workstations and a plurality of network equipment, each workstation and each network equipment being a protocol type of a set of protocol types, a system for automatically connecting a workstation of a particular protocol type with a network equipment of the same protocol type, each workstation of a particular protocol type having a unique physical characteristic as compared to workstations of other protocol types, said system comprising:

a plurality of workstation ports for connecting to one or more workstations;

a plurality of network equipment ports for connecting to one or more network equipment, at least one of said one or more network equipment being of the same protocol type as at least one of said one or more workstations;

means connected to said workstation ports for determining the protocol type of said set of protocol types of each of said workstations connected to said workstation ports by determining said unique physical characteristic of said workstation, said protocol determining means generating an output indicative of each said protocol type; and means, connected between said workstation ports and said network equipment ports, for establishing connections between said workstation ports and said network equipment pens, said establishing connections means being responsive to said protocol determining means output.

2. The system defined in claim 1 wherein said unique physical characteristic is a characteristic impedance and said protocol determining means comprises an impedance detection means for detecting the characteristic impedance of said workstations.

3. The system defined in claim 1 further comprising means connected to said network equipment ports for determining the protocol type of said network equipment, said network equipment protocol determining means generating an output indicative of said network equipment protocol and means, connected between said workstation ports and said network equipment ports, for establishing connections between said workstation ports and said network equipment ports, said establishing connections means being responsive to said network equipment protocol determining means output.

4. The system defined in claim 3 wherein said unique physical characteristic is a characteristic impedance and said network equipment protocol type determining means comprises a detection circuit for determining the characteristic impedance of said network equipment.

5. The system defined in claim 1 wherein said connection establishing means is responsive to said protocol determining means output so that a workstation of a particular protocol type is connected with a network equipment of the same protocol type.

6. For use with a system for configuring networks, said networks comprising a plurality of network workstations and a plurality of network equipment, each workstation and each network equipment being a protocol type of a set of protocol types, a method for automatically connecting a workstation of a particular protocol type with a network equipment of the same protocol type, each workstation of a particular protocol type having a unique physical characteristic as compared to workstations of other protocol types, said method comprising the steps of:

determining the protocol type of said set of protocol types of a first workstation by determining said unique physical characteristic of said workstation, said protocol determining means generating an output indicative of said protocol type; and establishing a connection, based upon said output, between said first workstation and a network equipment having the same protocol type of said set of protocol types as said first workstation.

7. The method defined in claim 6 wherein said unique physical characteristic is a characteristic impedance and said protocol type determining step comprises the step of detecting the characteristic impedance of said first workstation.

8. The method defined in claim 6 further comprising the steps of determining the protocol type of said network equipment, generating an output indicative of said network equipment protocol type and establishing connections between said workstation ports and said network equipment ports based upon said network equipment protocol type output.

9. The method defined in claim 8 wherein said unique physical characteristic is a characteristic impedance and said network equipment protocol type determining step comprises the step of determining the characteristic impedance of said network equipment.

10. An automatically reconfigurable network comprising:

a plurality of network workstations and a plurality of network equipment, each workstation and each network equipment being a protocol type of a set of protocol types, each workstation of a particular protocol type having a unique physical characteristic as compared to workstations of other protocol types;

means connected between said workstations and said network equipment for automatically connecting a workstation of a particular protocol type of said set of protocol types with a network equipment of the same protocol type of said set of protocol types comprising a plurality of workstation ports for connecting to one or more workstations, a plurality of network equipment ports for connecting to one or more network equipment, at least one of said one or more network equipment being of the same protocol type as at least one of said one or more workstations, means connected to said workstation ports for determining the protocol type of said one or more workstations by determining said unique physical characteristic of each said one or more workstations, said protocol determining means generating an output indicative of said protocol type, and means, connected between said workstation ports and said network equipment ports, for establishing connections between said workstation ports and said network equipment ports, said establishing connections means being responsive to said protocol determining means output.

11. The network defined in claim 10 wherein said unique physical characteristic is a characteristic impedance and said protocol determining means comprises an impedance detection means for detecting the characteristic impedance of said workstations.

12. The network defined in claim 10 further comprising means connected to said network equipment ports for determining the protocol type of said network equipment, said network equipment protocol determining means generating an output indicative of said network equipment protocol and means, connected between said workstation ports and said network equipment ports, for establishing connections between said workstation ports and said network equipment ports, said establishing connections means being responsive to said network equipment protocol determining means output.

13. The network defined in claim 12 wherein said unique physical characteristic is a characteristic impedance and said network equipment protocol type determining means comprises a detection circuit for determining the characteristic impedance of said network equipment.

14. The network defined in claim 10 wherein said connection establishing means is responsive to said protocol determining means output so that a workstation of a particular protocol type is connected with a network equipment of the same protocol type.

15. For use with a plurality of network workstations and a plurality of network equipment, each workstation and each network equipment being a protocol type of a set of protocol types, and a switch for connecting said workstations with said network equipment, a system for determining the particular protocol type of said set of protocol types of each workstation so that a workstation of a particular protocol type may be connected by said switch with a network equipment of the same protocol type, each workstation of a particular protocol type having a unique physical characteristic as compared to workstations of other protocol types, said system comprising:

a plurality of workstation ports for connecting to one or more workstations; and means connected to said workstation ports for determining the protocol of said one or more workstations based upon said unique physical characteristic of each workstation, said protocol determining means generating an output to said switch indicative of said protocol type.

16. The system defined in claim 15 wherein said unique physical characteristic is a characteristic impedance and said protocol determining means comprises an impedance detection means for detecting the characteristic impedance of said workstations.

17. The system defined in claim 15 wherein said unique physical characteristic is a characteristic voltage and said protocol determining means comprises a voltage detection means for detecting a characteristic voltage of said workstations.

18. The system defined in claim 15 wherein said unique physical characteristic is a characteristic cable identification and said protocol determining means comprises a cable identification detection means for detecting a characteristic cable identification of said workstations.

19. For use with a plurality of network workstations, each workstation being a protocol type of a set of protocol types, a system for automatically connecting a workstation of a particular protocol type with another workstation of the same protocol type, each workstation of a particular protocol type having a unique physical characteristic as compared to workstations of other protocol types, said system comprising:

a plurality of workstation ports for connecting to one or more workstations;

means connected to said workstation ports for determining the protocol type of said set of protocol types of each of said workstations connected to said workstation ports by determining said unique physical characteristic of said workstation, said protocol determining means generating an output indicative of each said protocol type; and means, connected to said workstation ports, for establishing connections between said workstation ports, said establishing connections means being responsive to said protocol determining means output.

20. The system defined in claim 19 wherein said establishing connections means establishes connections between workstations having the same protocol type.

* * * * *